United States Patent [19]

Campbell et al.

[11] Patent Number: 4,519,553
[45] Date of Patent: May 28, 1985

[54] MULTIPLE SPINDLE WINDING APPARATUS

[75] Inventors: Jesse L. Campbell; Alan A. Fennema; Robert B. Henderson, all of Tucson, Ariz.; William G. Rance, Jr., West Palm Beach, Fla.; Paul H. Whittington; William O. Wightman, Jr., both of Tucson, Ariz.

[73] Assignee: International Business Machines Corporation, Armonk, N.Y.

[21] Appl. No.: 626,948

[22] Filed: Jul. 2, 1984

[51] Int. Cl.³ .................... B31F 5/04; B65C 3/12; B65H 19/28
[52] U.S. Cl. .................... 242/56 R; 156/446; 156/505; 242/74
[58] Field of Search ............ 242/56 R, 74, 197, 71.1; 156/187, 446, 505, 506; 414/222, 226, 736, 753

[56] References Cited

U.S. PATENT DOCUMENTS

| | | | |
|---|---|---|---|
| 3,633,839 | 1/1972 | Clark | 242/56 R |
| 3,693,900 | 9/1972 | Bohn | 242/56 R |
| 3,940,080 | 2/1976 | Bennett | 242/56 R X |

*Primary Examiner*—Stuart S. Levy
*Assistant Examiner*—L. Sohacki
*Attorney, Agent, or Firm*—James M. Thomson

[57] ABSTRACT

Winding apparatus for continuously winding tape media upon reels contained within closed cartridges. The winding apparatus includes means for supplying cartridges alternatively to three separate in-line winding channels all of which perform a winding function and then collecting the wound cartridges off the individual lines and presenting an output station for a subsequent packing operation. Each channel includes vacuum extension means for reaching through an opening in each cartridge to apply an adhesive patch to the hub of the reel contained within the cartridge. Each line also includes means for continuously supplying tape media to a wind station for winding upon the reels passing through that line. At the wind station, additional vacuum means bring the leading edge of the media into the cartridge and press it against the adhesive patch, thereby attaching the media to the reel. Means are provided for winding the attached media upon the reel to one of the predetermined category of sizes, and then severing the media while maintaining control of the supply end for feeding it to the next cartridge. At a following station a leader block is applied to the trailing edge of the media associated with each completed reel to complete the winding operation. Cleaning and ID printing stations are also provided, if desired.

10 Claims, 14 Drawing Figures

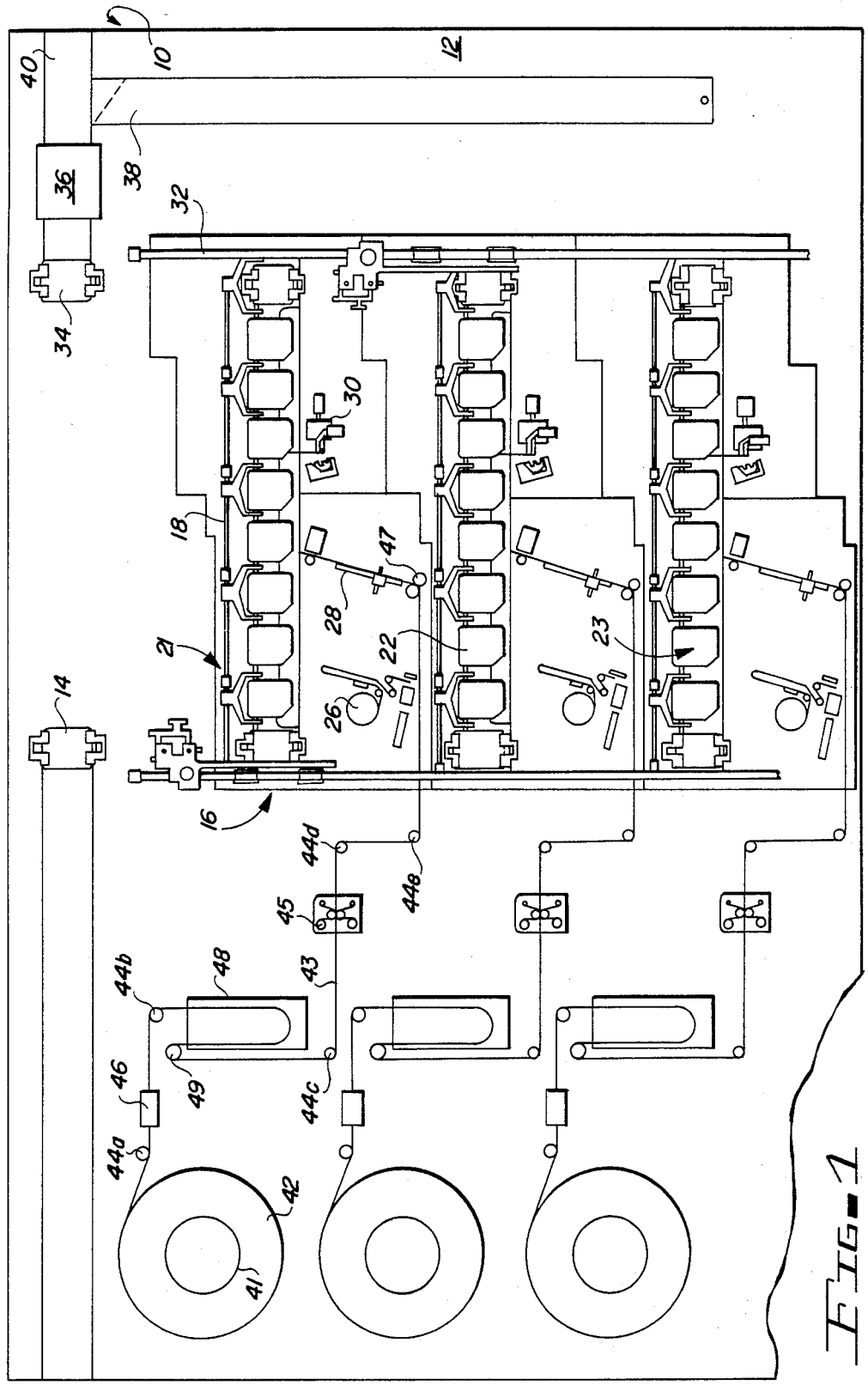

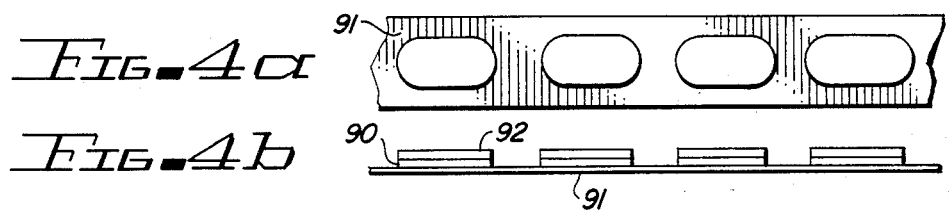
Fig-4a
Fig-4b
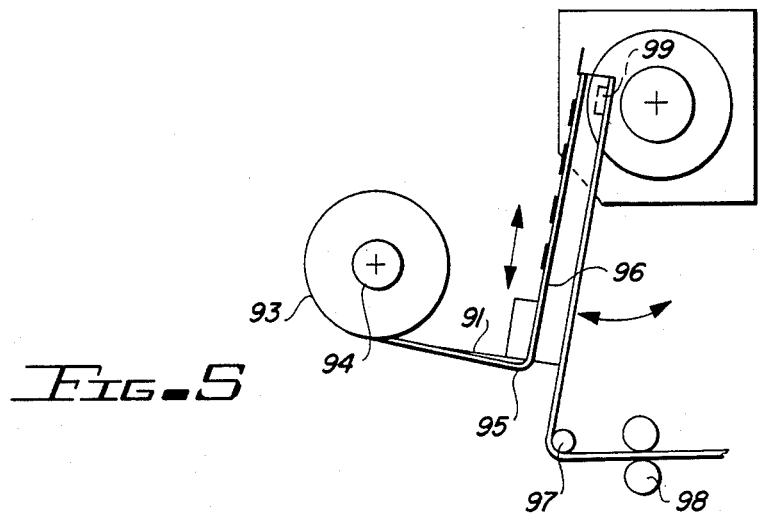
Fig-5
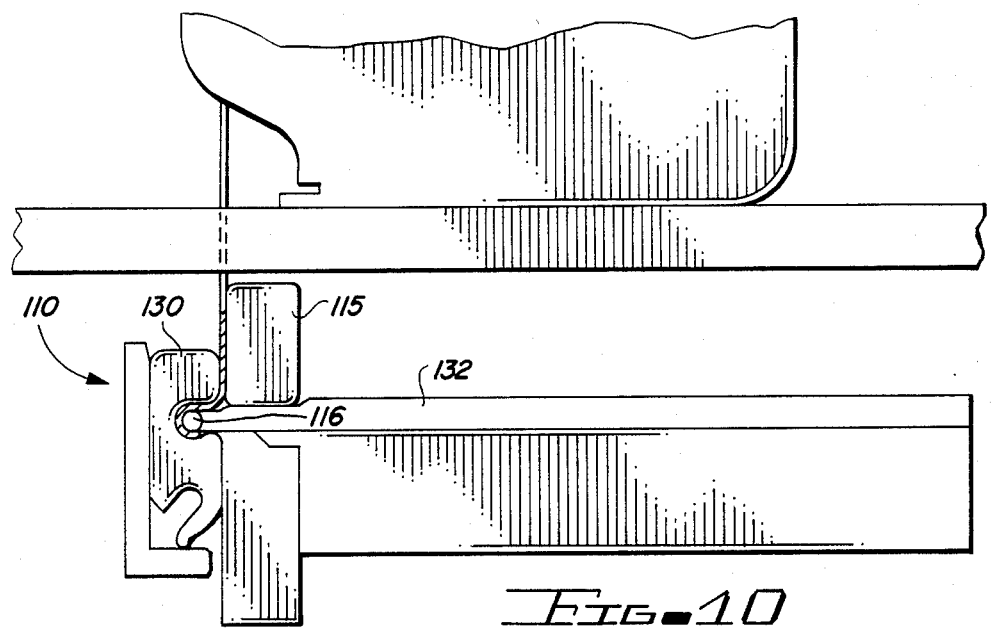
Fig-10

MULTIPLE SPINDLE WINDING APPARATUS

BACKGROUND OF THE INVENTION

The present invention relates to multiple channel winding apparatus for winding tape media upon reels. More particularly, the invention concerns such winding apparatus for winding tape upon reels contained within a relatively closed cartridge.

DISCUSSION OF THE PRIOR ART

Magnetic recording tape cartridges are widely used in industry and therefore manufacturing of wound cartridges is a significant business. It has been recognized that winding of tape on the reels prior to placing of the reels within cartridges is undesirable because of contamination that may reside in and around the tape prior to the time the cartridge is closed. Accordingly, it is desirable to wind tape upon the reels within a relatively closed cartridge.

Various techniques have been suggested for accomplishing such winding. In the case of cartridges having both a supply and a take-up reel one technique used in the prior art is to start with an empty cartridge having a length of leader tape with one end connected to each hub. The first step in filling the cartridge with blank tape is then to cut the leader tape to form two discrete leaders and to splice the tape to be wound into the cartridge to one of the leaders. After winding, the tape is again cut and the trailing end of the tape is spliced to the leader on the other hub.

In the event that only a single reel is used within the cartridge, the leader attach technique has also been used, but in that event the leader is left to dangle freely within the cartridge where it can be picked up for splicing to the supply tape. This technique suffers a disadvantage in that the leader to tape splice results in an uneven area when wound on the cartridge, which in turn results in print through onto the recording tape.

Accordingly, a need exists in the prior art for winding means capable of automatically winding tape in seriatim fashion upon reels contained within tape cartridges without utilizing splicing operations. Another need exists in the art for a high volume winding apparatus capable of producing large numbers of wound cartridges without substantial operator intervention.

SUMMARY OF THE INVENTION

Accordingly, it is an object of the invention to provide a winding apparatus for automatically winding tape media upon reels contained within substantially closed cartridges.

It is another object of the invention to provide a multi-channel winding apparatus for producing high volumes of wound cartridges without substantial operator intervention.

These and other objects and features are attained in a winding apparatus that includes means for supplying cartridges to three separate in-line winding channels all of which perform winding operations, and then collecting the wound cartridges from each channel at an output station where they can be packed into containers. Each channel includes means for continuously supplying media to the winding station for winding upon the reels of cartridges passing through that line. At another station, vacuum extension means are provided for reaching through an opening in each cartridge to apply an adhesive patch to the hub of the reel contained within the cartridge.

At the winding station, additional vacuum means bring the leading edge of the media into the cartridge and press it against the adhesive patch, thereby attaching the media firmly to the reel. Drive means are provided for winding the media upon the reel to one of a predetermined category of sizes, and cutting means are provided for severing the media while maintaining control of the supply end by vacuum means to enable it to be fed to the next cartridge. At a following station, means are provided for fastening a leader block to the trailing edge of the media associated with each wound reel to complete the winding operation.

BRIEF DESCRIPTION OF THE DRAWINGS

The above and other features and advantages of the invention will become apparent from the following detailed description taken in conjunction with the accompanying drawings wherein, FIG. 1 is a schematic layout of the winding apparatus of the invention illustrating three parallel channels;

FIG. 2b is a detail of one side of the mechanism of FIG. 2a;

FIG. 3b is a cross-sectional view of the gear box illustrated in FIG. 3a;

FIG. 4a is a detail of a section of the adhesion supply tape;

FIG. 4b is a side view of the adhesion supply tape illustrated in FIG. 4a;

FIG. 5 is a schematic layout of the adhesive apply stations;

FIG. 10 is a detail of additional features of the leader block attach station.

DETAILED DESCRIPTION OF THE INVENTION

Figure 2A:
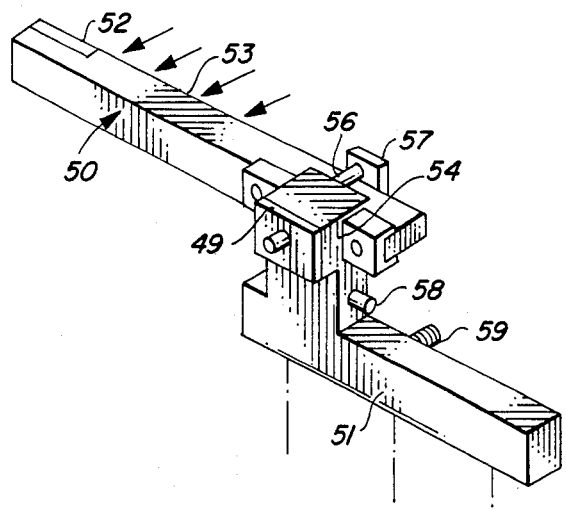
FIG. 2a illustrates features of a vacuum probe extension.

Referring now to the drawings and particularly to FIG. 1, a preferred embodiment of the invention is illustrated comprising a multichannel winding system for winding tape upon reels contained within cartridges. The system is generally indicated by the numeral 10 and includes three separate winding channels all supported upon a frame 12.

The frame is mounted in a vertical orientation whereby contact of scrap and contamination with respect to the work stations of the winder is minimized. It should be recognized that the winding apparatus could be a single spindle or a multiple spindle system of more or less than three channels. However, it has been found that three channels can be conveniently located on a single frame and serviced by an operator, if necessary.

The channels receive cartridges as needed from a cartridge input station 14 via a vertical cartridge mover 16, which alternately supplies cartridges to each channel. When a cartridge is placed in a given channel, such as the top channel generally indicated by numeral 21, the cartridge is translated from left to right in the figure by a horizontal cartridge move mechanism 18 past an adhesive apply station 26, media attach and wind station 28 and a leader block attach station 30.

Upon completion of the operations at the respective stations, the cartridge is picked up by another vertical cartridge mover 32 and returned to a cartridge output station 34. From the cartridge output station, the cartridge is moved through a marking station 36, if desired and can be placed in a reject chute 38 or in a packing chute 40 whereby the cartridge is delivered to a packing unit, not illustrated.

Details of the adhesive apply station 26 are explained hereinafter in connection with FIGS. 4 and 5. The tape supply with respect to the media attach and wind station is generally illustrated on the left-hand side of FIG. 1 designated as supply reel 42 for channel 21. The supply reel is mounted on a hub 41 and supplies a continuous web of tape along path 43 under the control of rollers 44a–e and/or air bearings. The tape is passed by a splicing mechanism 46 and is placed under predetermined tension by a vacuum column 48 under the control of a tachometer 49. A cleaning station 45 is provided in tape path 43 and a pinch roll set 47 is illustrated at the base of the probe of the attach and wind station 28.

From FIG. 1, the general flow of cartridges through the stations should be understood. Thus, blank cartridges are brought in on the upper left part of the frame via the cartridge input station where they are available to be picked up by the vertical cartridge mover and placed in one of the three channels of the winder. When a cartridge is placed in a channel of the winder, it is picked up by the horizontal cartridge mover and moved incrementally from left to right past the various operating stations.

At the adhesive apply station, a probe enters an opening at the lower left corner of the cartridge and places an adhesive patch on the reel of the cartridge in a manner described hereinafter. The probe then withdraws and the cartridge advances through several incremental positions until it reaches the media attach and wind station.

At the media attach and wind station, another vacuum probe enters the cartridge through the lower left-hand opening, and adheres an end of the media to the adhesive around the reel hub. When an attach is achieved, the probe withdraws and a drive is actuated to wind a predetermined amount of tape on the reel within the cartridge. When the predetermined reel size is reached, the winding operation is stopped and a cutting mechanism cuts the media. The cutter leaves the trailing end of the cartridge reel free, but means are provided for maintaining positive control over the supply end whereby it is controlled by the attach and wind station for attachment to a subsequent cartridge.

The wound cartridge then proceeds to the leader block attach station where a leader block is attached to the free end of the tape. Upon completion of this operation which is explained in more detail in connection with FIGS. 8 and 9, the cartridge is advanced by the horizontal transport to an output station where it can be picked up by another vertical cartridge mover and placed in a cartridge output line.

From the cartridge output line, the cartridge can be marked if desired, or it can be designated as a passed or rejected cartridge depending upon successful operations at each of the aforementioned stations. In the case of a rejected cartridge, an opening is provided to permit the cartridge to move through a reject shoot where it can be picked up by an operator for further inspection or rework.

Figure 2B:
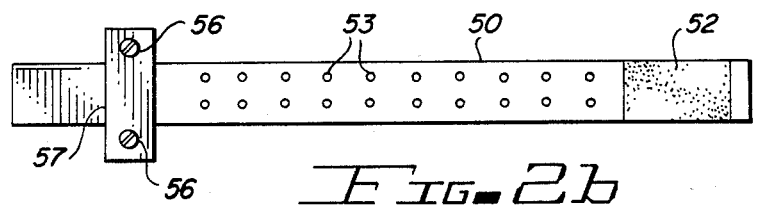

Referring to FIGS. 2a and 2b, the details of the media film attach probe extension are illustrated. It should be understood that generally the same probe extension and drive mechanism design is used for the adhesive attach probe and the media attach probe. The probe includes an elongate member 50 which includes internal vacuum channels that communicate with a vacuum manifold 51 to which extension 50 is attached. The face of extension 50 is provided with an insert 52 of porous resilient material such as polyurethane and it is also provided with a number of openings 53 arranged in a regular pattern as shown in FIG. 2b whereby a strip of film or tape can be adhered to the face of the insert by vacuum pressure.

An air operated clamp 54 is illustrated at the upper half of manifold 51. The clamp includes a cylinder housing generally included at 49 wherein two movable pistons 56 are retained. A clamp member 57 is secured between the pistons. A conventional cylinder mechanism, serves to move the clamp between a closed position wherein it retains film against the extension and an open position wherein it permits film to pass along the extension during a winding operation. FIG. 2a otherwise illustrates a pressure line fitting 58 adapted to be connected to external air pressure supply and a vacuum line fitting 59 adapted to be connected to an external vacuum supply.

Figure 3A:
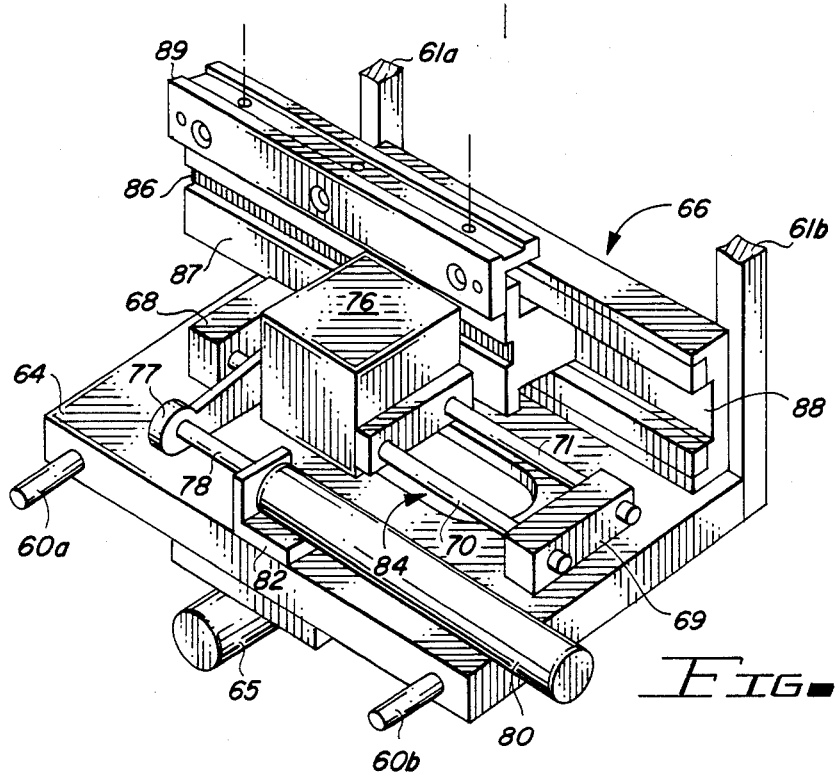
FIG. 3a is a detail of the structure of the drive mechanism and support for the probe extension.

FIG. 3a illustrates a drive mechanism for supporting and moving the extension in X and Y directions. The drive mechanism includes a pair of X axis support rods 60a and 60b attached at either end to fixed supports 61a–d, two of which are illustrated. The fixed supports are adapted to be secured to the winder frame locating the drive mechanism and extension at the desired orientation with respect to cartridges as is generally illustrated in FIG. 6. A platform 64 having openings therein for members 60a, 60b is mounted for X axis translation with respect thereto. An X axis cylinder 65 is provided having its base attached to platform 64 and its piston end attached to a member extending between supports 61a, 61b. Thus, operation of the cylinder serves to translate platform 64 back and forth along the X axis.

Platform 64 serves as the support for a guide mechanism 66 and brackets 68, 69 which support Y guide rods 70, 71. Guide rods 70, 71 support a gear box 76 which is attached via a bracket 77 to the piston 78 of a Y axis cylinder 80 having its body attached via bracket 82 to platform 64. Thus, operation of cylinder 80 will translate the gear box in a Y direction.

Figure 3B:
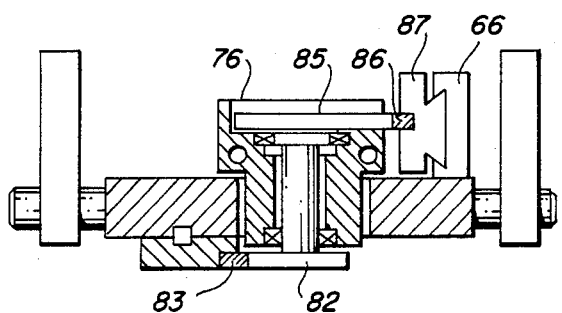

As shown in FIG. 3b, a gear box 76 retains a pinion 82 adapted to extend through opening 84 formed in platform 64. The pinion engages a corresponding platform 83 formed on the edge of platform 64 whereby the pinion is rotated as the gear box is driven in the Y direction. Pinion 82 is mounted on a shaft which is also secured to another pinion 85 that engages a rack 86 on slide 87. As shown, slide 87 is retained within a channel 88 formed in member 66 by an extension support 89 to which the probe extension is secured.

Therefore, as cylinder Y operates in the Y direction, the gear box provides a three to one gear ratio that moves the extension laterally along the Y direction through a previously determined motion described herein.

Referring now to FIGS. 4 and 5, apparatus comprising the adhesive attach station is described for attaching a piece of adhesive to the reel of a tape cartridge. It is desired to transfer an adhesive patch from a release paper to a reel contained within the cartridge, with the adhesive patch being attached smoothly to eliminate adhesive print-through to the media subsequently placed within the cartridge. It is also desired that the adhesive be transferred central to the flanges of the reel whereby the subsequent winding operation can be carried out without causing the web of tape to float in contact with either side of the reel hub.

The adhesive system is illustrated in FIG. 4 including adhesive patches 90 being attached to a release paper 91, with each patch being covered by a protective paper 92 of the same geometry. The adhesive system illustrated can be supplied in rolls, and an opening is provided under each patch whereby the successful transfer of a patch from the release paper can be monitored by optical means, if desired.

Referring to FIG. 5, apparatus is illustrated for applying the adhesive to a reel retained within a cartridge. It should be recognized that the probe extension and drive means used at the adhesive attach station are similar to the probe means used at the tape attach and winding station described herein. As shown, the adhesive system is provided in a roll 93 loaded on an adhesive supply support 94. The adhesive carrying strip 91 is threaded around a friction block 95 and over the end of an extension 96. The strip is otherwise retained around a guide roller 97 located at the base of the extension and directed through pressure rolls 98. A resilient material 99 is provided at the end of extension 96, facing the reel and with the strip extended thereover.

The extension is moved within the cartridge, strips the protective paper and transfers the adhesive patch to the reel. Thus, a length of release paper with adhesive and protective paper is paid out from supply roll and threaded over the extension. The friction block is adjusted to establish an adequate tension of the release paper between the friction block and the pressure rolls.

Upon completion of threading and setting the release paper tension, the adhesive patches are advanced one by one in increments of the pitch of the patches. During the advance of the release paper, due to the tension and differential of peel adhesion between the protective paper and the release paper, the protective paper tends to continue in a straight path as the release paper makes a 90 degree turn at the end of the extension. The protective patches are then pulled into a vacuum scrap tube, not illustrated, whereby the adhesive is exposed.

The exposed adhesive patch is then located central to the resilient material contained on the end of the extension. Consequently, as the extension is advanced vertically within the cartridge, the adhesive patch is aligned with the tangent point of the reel diameter. At this point, the vertical movement of the extension is halted and the extension is subsequently moved through a small horizontal distance, causing the resilient material and the adhesive patch to conform to the radius of the reel. The extension is then retracted horizontally, and a peeling action occurs between the adhesive patch and the release paper, leaving the adhesive smoothly attached to the reel hub. The attach is aided since the clamp 89 at the base of the extension is actuated. This prevents slack from existing along the length of the extension whereby the carrier paper can be pulled away with the patch as the extension is withdrawn.

After transfer of the adhesive patch, the extension is retracted horizontally and subsequently retracted vertically to its starting position, in preparation for operations with respect to the next cartridge.

Figure 6A:
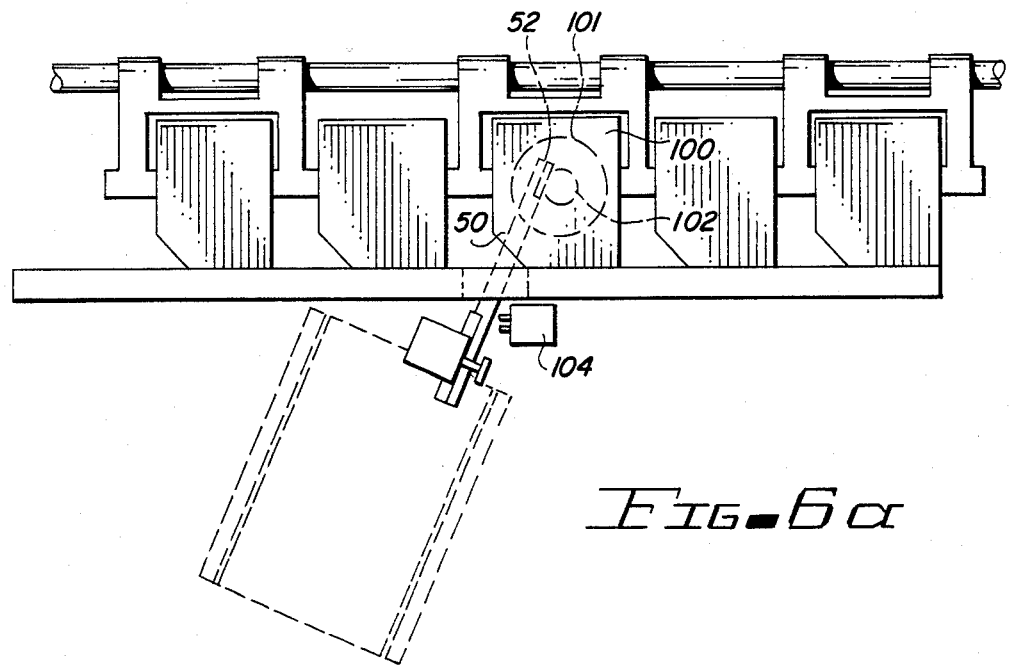
FIG. 6a is a schematic of the probe extension as used for adhesive transfer and media attach operations.

Referring to FIG. 6a, the orientation of the attach probe with respect to the cartridge is illustrated. FIG. 6a shows an extended position of the attach probe wherein the probe is inserted through a corner opening of the cartridge at an angle of about 17 degrees with respect to the vertical edge of the cartridge. This permits clearance between the extension of the probe and the cartridge opening, and it also permits the probe to extend past the inner periphery 102 of the reel 101 which is illustrated in dotted outline within cartridge 100, for example. The extension length of the probe is selected so that the resilient end member moves slightly past a tangential position with respect to the center of the reel. The probe extension is located about one-quarter inch away from the reel hub at this point. Motion to place the reel probe in this position is attained through movement of the Y axis cylinder 80 of FIG. 3 under computer control, for example.

Translation of the X axis cylinder 65 of FIG. 3 is used to move the probe between the insert position wherein it clears the cartridge reel and the attach position wherein the resilient portion is brought into firm contact with the wheel periphery.

Figure 6B:
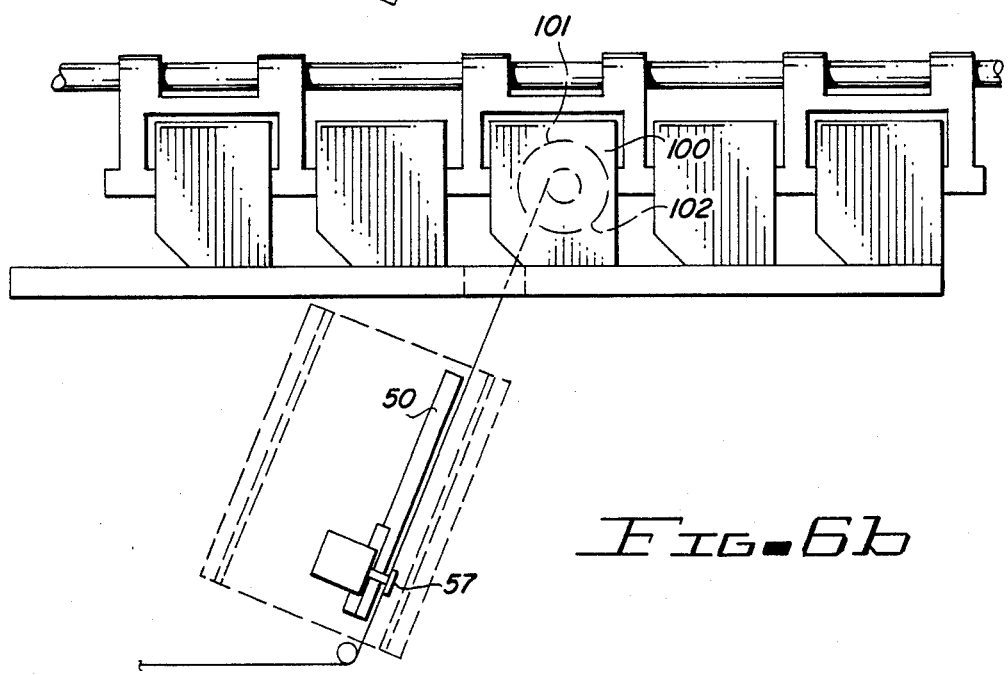
FIG. 6b is a schematic of the probe extension as used for media attach, in the retracted and left position after completion of an attach operation.

The operation of the probe is explained hereinafter with the probe in a retracted position with the tape severed just above the end of the probe, and with an unwound cartridge presented to the attach and wind station as illustrated in FIG. 6b. The probe is advanced with a length of tape adhered thereto by vacuum force and by means of clamp 57. With the probe inserted fully into the cartridge, the cylinder 65 is actuated to move the probe in an X direction until the resilient face of the probe conforms to the periphery of the adhesive layer on the reel hub. Sufficient force is applied to adhere the end of the tape to the adhesive and hub. Cylinder 65 is then reversed moving the extension away from the reel hub. The porosity of the resilient insert permits the tape to adhere to the reel without turning off the vacuum supply. A vacuum sensing element provides an indication whether positive attach was achieved. In the event attach was achieved, then the vacuum supply is turned off, clamp 57 is opened and the probe is withdrawn whereby a winding operation can commence.

In the event that positive attach is not achieved, then the cylinder 65 is moved back into the attach position whereby a retry attempt is made to achieve attach of the tape to the reel hub. In the event that a second or third retry is not successful, then an indication can be provided via the operation control for an operator to intervene.

Assuming positive attach is achieved, the probe is withdrawn. Then a winding operation commences whereby the reel is wound to a predetermined diameter with the probe in a withdrawn position. Upon achievement of the desired diameter, cutters 104 are rotated into the tape path and vacuum is again applied to the probe extension to secure the tape firmly to the extension. Clamp 57 is also moved to a closed or retaining position. The cutters are subsequently actuated to sever the tape just above the probe end with the supply end being retained on the extension and the trailing end being left free with the cartridge reel. A suitable cutting mechanism is described in Precision Adjustable Shears, IBM TECHNICAL DISCLOSURE BULLETIN, Vol. 24, No. 7B, December 1981 page 3658.

Upon completion of the winding and severing operation, the horizontal transport is actuated to move the cartridge with the wound reel to the next station and to present a new cartridge to the attached station whereby the operational cycle can be repeated. The apparatus described is particularly advantageous in that it is compact due to the use of a three to one drive ratio in the Y axis and in that it utilizes an extension mounting angle with respect to the cartridge that permits extension of the cartridge through the corner opening without impacting the reel or the cartridge housing. The apparatus otherwise enables the retention of positive control over the tape at all times whereby automatic winding of cartridges in seriatim is possible.

Figure 9:
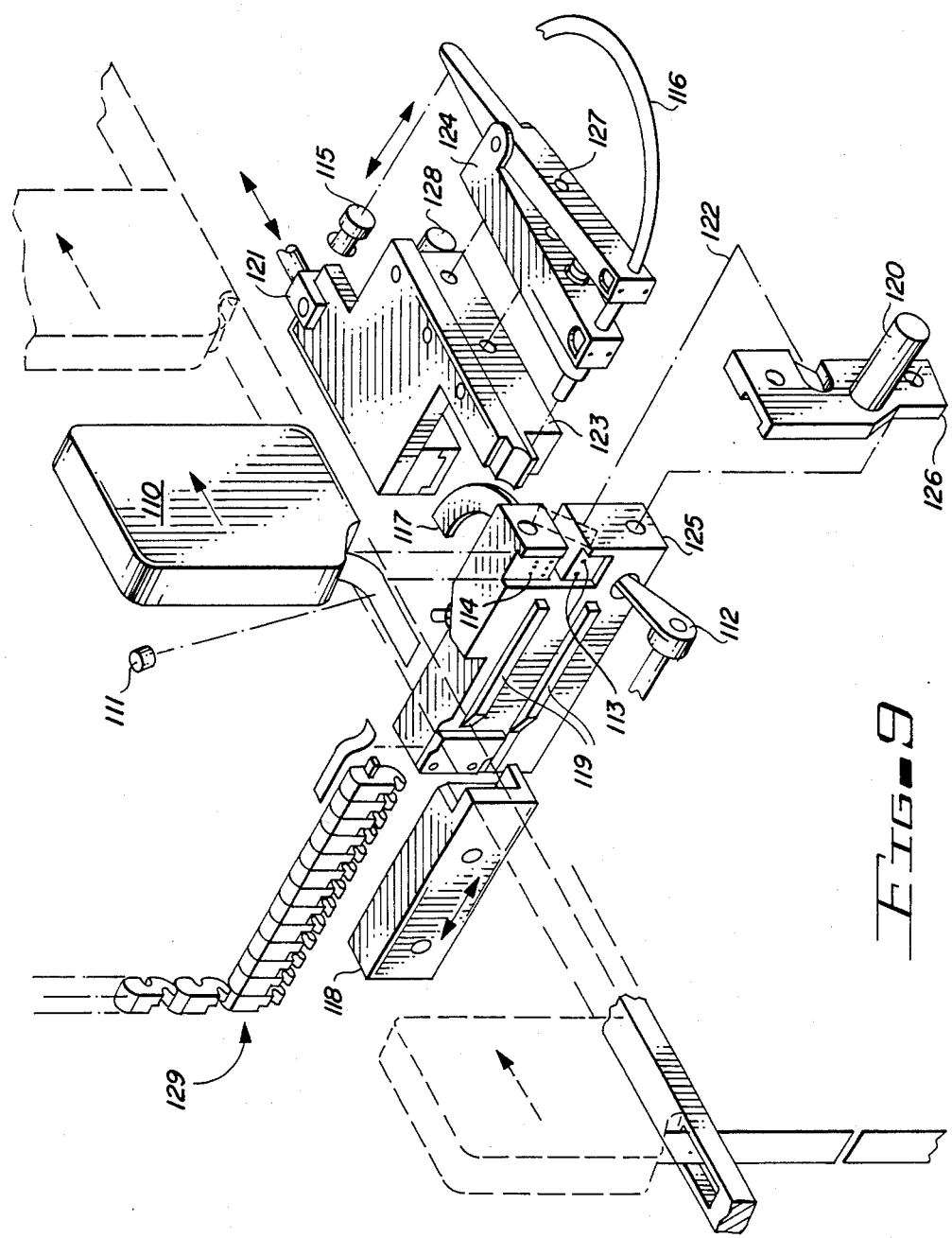
FIG. 9 is a detail of the leader block attach station.

Referring now to FIGS. 9 and 10, the leader block attach apparatus and operation will be described. As the cartridge moves to the leader block attach station 110, the tape is blown down with orifice 111. Wiper 112 pulls the tape over vacuum switch sensor holes 113. If the tape does not cover the holes completely, the vacuum switch will not operate and the tape is blown off via the same holes 113 and 114. Wiper 112 then goes up, the orifice goes on again and another attempt is made to locate the tape as described above.

Once the tape is properly located, insert feeder 115 is moved forward moving insert material 116 into engagement with position flag 117. The length of the feed is determined by adjustment screw 127. Leader block transport carrier 118 moves forward and is stopped by an adjustable stop thus making it possible to locate the tape accurately on the leader block. Spring loaded stripper 119 drops in behind the leader block, preventing it from falling back into the machine if no attach is made. The strippers also guide the leader block up into the cartridge.

Air cylinder 120 positions the leader block against transport carrier 118 to insure proper tape location. Insert carrier 121 then moves forward, forcing insert material 116 through the razor blade 122, thereby severing it. A feeder carrier 123 is latched in one of two positions on insert carrier 121 with a ball plunger in a detent. When the feeder carrier 123 hits vacuum block 125, the insert carrier continues to travel whereby insert material holds the tape to the leader block.

Insert carrier 121 then returns, resetting the ball plunger when the feeder carrier stops on stop 128. The station 110 clutch then engages and winds the leader block into the cartridge. A tapper (not illustrated) snaps the leader block into the cartridge. The leader block transport carrier 118 then returns. Increment cylinder 129 moves forward pushing one leader block off the guide rail and under a spring that positively moves the leader block down to the transport carrier whereby the apparatus is ready for the next cartridge.

FIG. 10 illustrates the attached leader block as related to the cartridge and carriers.

Figure 7:
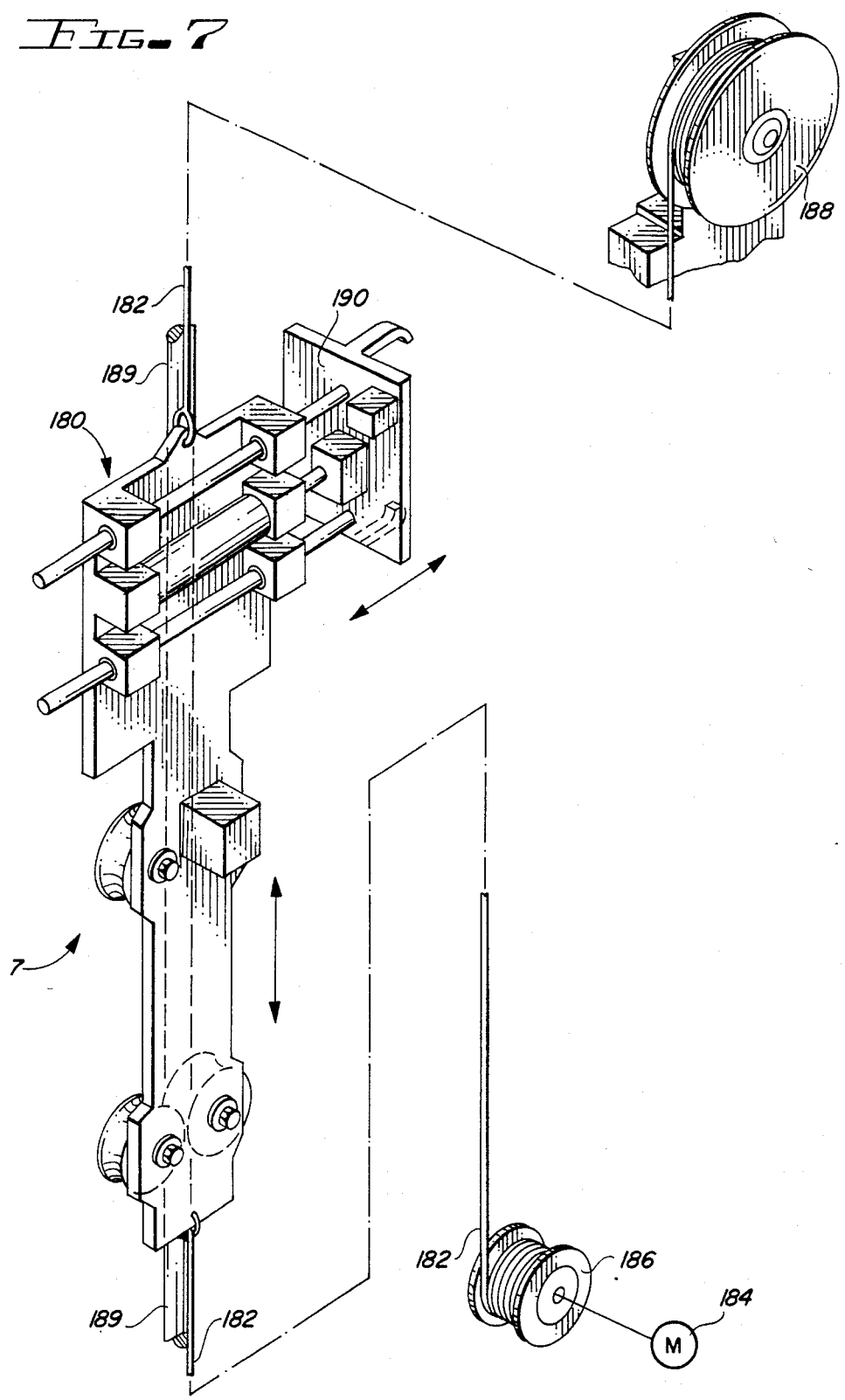
FIG. 7 is a detail of the horizontal transfer assembly.
Figure 8:
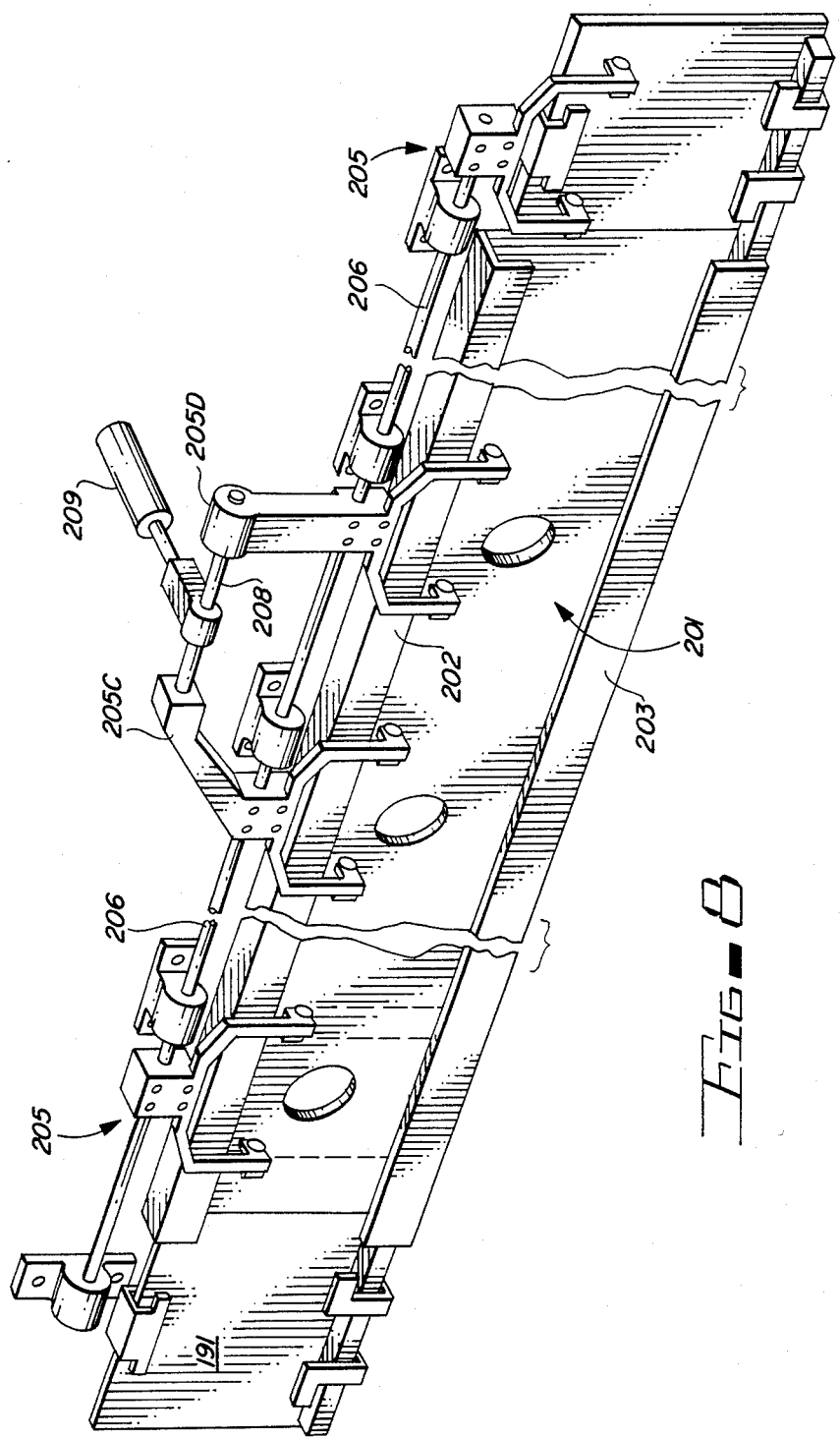
FIG. 8 is a detail of the vertical transport assembly and pick-up apparatus.

Referring now to FIGS. 7 and 8, the details of the vertical and horizontal transport assemblies are illustrated. The vertical transport station 180 is moved vertically since it is attached to a continuous belt 182 driven by a motor 184. The belt is supported around rollers 186, 188 at either end of a vertical support 189. Assembly 180 includes a grasping head 190, which includes fingers adapted to engage the upper and lower surfaces of a cartridge suspended in the cartridge input station 191. After grasping a cartridge, the finger assembly is withdrawn slightly to provide clearance and the assembly 180 is translated downward until it aligns with the input section of one of the previously described winding channels. Assembly 180 can be programmed to feed cartridges in seriatim to a single channel or alternately to two or three channels, as needed. With a given cartridge in alignment with the end of the selected channel, the finger assembly is moved toward the frame whereby the cartridge is placed in the channel entry duct. The cartridge can be retained there by resilient means such as springs on the top and bottom of the cartridge, for example and the finger assembly is withdrawn.

The cartridge is then picked up by the horizontal transport and moved through the channel.

Referring to FIG. 8, the horizontal channel is defined by a track 201 upon which the cartridge sits. Front members 202, 203 are provided along the length of the channel on the facing of the track to define retaining edges for the cartridge. Members 202, 203 are of selected length whereby an entry duct and a removal duct are available at either end of the channel proximate to the vertical transport mechanisms. Horizontal travel of the cartridge is defined by multiple finger mechanisms 205, which also control spacing between the cartridges. The finger mechanisms 205 are attached to a common shaft 206 which shuttles back and forth and holds the product for performance of a given operation. For advancing the cartridge, the mounting shaft rotates and the fingers swing outward to clear the product. The fingers of the shaft assembly are retracted by movement along the shaft axis and then rotated inwardly to regrasp the next cartridge for a subsequent indexing. The rotation of shaft 206 is effected by a shaft 208 driven by a cylinder 209. As shown, shaft 208 is connected to upper portions of members 205c and 205d in the center of the horizontal transport. Clutch assemblies, not illustrated, are provided on the back of the frame to move into contact with the reel drive mechanism of each cartridge, whereby the reel can be held in a stationery mode while located at the operating stations of the winder.

High indexing speeds are obtained in the mechanism by use of an electric drive motor controlled by a digitally stored motion profile and a closed loop servo system not illustrated.

What is claimed is:

1. A winding apparatus for winding media successively upon a plurality of reels, each contained within a cartridge, comprising;

means for supplying cartridge in seriatim fashion through a series of in-line operating stations;

means for continuously supplying media to one of said stations for winding upon the reel;

extension means at an adhesive station for reaching through an opening in a cartridge positioned proximate thereto for applying an individual adhesive patch to the hub of the reel within the cartridge;

vacuum means at an attach station for bringing a leading section of the media into the cartridge positioned therein and pressing it to said adhesive patch, thereby attaching the media to the reel;

means for winding media upon the reel to one of a predetermine category of sizes;

means for severing the media from the wound reel, while maintaining control of the supply end for feeding the next cartridge; and means at a following station for fastening a leader block to the trailing ends of the media associated with each wound reel.

2. A winding apparatus for automatically winding media successively upon a plurality of reels, each contained within a cartridge, comprising:
   a frame including cartridge input and output stations,
   a plurality of winding channels located on said frame, each channel being oriented in a relatively vertical orientation with respect to the other said channels,
   vertical transport means for moving cartridges from the cartridge input station to input ducts of the respective channels in an ordered fashion,
   vertical transport means for moving wound cartridges from output ducts of the respective winding channels to the cartridge output station,
   a plurality of operating stations associated with each channel for attaching adhesive patches and strips of media to the reel hubs of cartridges proximate to said operating stations,
   means for winding tape upon said reels to predetermine sizes, and means for severing of the tape at the outer end of the wound reel.

3. The apparatus of claim 1 wherein the supply means include a cartridge supporting track and selectively moveable fingers for engaging cartridges retained upon the track for moving said cartridges along the track between stations.

4. The apparatus of claim 3 wherein the supply means further includes a vertical transport means for selectively moving cartridges from a cartridge input station to input ducts of the cartridge supporting track.

5. The apparatus of claim 3 wherein said extension means is mounted for reaching through an opening in the cartridge at approximately a 17 degree angle with respect to the vertical orientation of the cartridge whereby the extension can pass into the cartridge without contacting the hub of a reel contained within the cartridge.

6. The apparatus of claim 5 wherein said vacuum means includes means for translating a section of media along another extension member mounted to enter the cartridge at about a 17 degree angle and further including clamp means for retaining the media against the extension means whereby the media can be retained against the adhesive patch when the vacuum means are withdrawn from the cartridge.

7. The apparatus of claim 2 wherein the plurality of operating stations include extension means at an adhesive apply station adapted to reach through an opening in a cartridge position proximate thereto for applying an individual adhesive patch to the hub of the reel within the cartridge.

8. The apparatus of claim 7 wherein said extension means is mounted for reaching through the opening in the cartridge at about a 17 degree angle with respect to the vertical orientation of the cartridge whereby the extension means passes into the cartridge without engaging the hub of the reel.

9. The apparatus of claim 2 wherein said plurality of operating stations further includes vacuum means at an attach station for bringing a leading edge of the media into the cartridge and pressing it into engagement with said adhesive patch, thereby attaching the media to the reel.

10. The apparatus of claim 9 wherein said vacuum means includes another extension member also mounted for reaching through an opening in the cartridge at approximately a 17 degree angle with respect to the vertical orientation of the cartridge, and wherein said extension means is adapted for horizontal movement with respect to the cartridge to bring a resilient path at the end of the extension into contact with the reel hub.

* * * * *